US010846156B2

(12) United States Patent
Zhan et al.

(10) Patent No.: US 10,846,156 B2
(45) Date of Patent: Nov. 24, 2020

(54) METHODS, DEVICES AND COMPUTER PROGRAM PRODUCTS FOR MANAGING SOFTWARE FUNCTION

(71) Applicant: Dell Products L.P., Round Rock, TX (US)

(72) Inventors: Jun Zhan, Shanghai (CN); Wen Yu Tang, Shanghai (CN); Xiang Huang, Shanghai (CN); Wei Liu, Shanghai (CN); Han Gao, Shanghai (CN); Le Wei Ji, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/523,625

(22) Filed: Jul. 26, 2019

(65) Prior Publication Data

US 2020/0327002 A1 Oct. 15, 2020

(30) Foreign Application Priority Data

Apr. 15, 2019 (CN) .......................... 2019 1 0300611

(51) Int. Cl.
*G06F 9/54* (2006.01)
*G06F 21/54* (2013.01)

(52) U.S. Cl.
CPC .............. *G06F 9/547* (2013.01); *G06F 21/54* (2013.01)

(58) Field of Classification Search
None
See application file for complete search history.

(56) References Cited

U.S. PATENT DOCUMENTS

| 2007/0097998 | A1* | 5/2007 | Raikar | ................. | H04L 12/467 370/409 |
| 2009/0094312 | A1* | 4/2009 | Powley | .................. | G06F 9/547 709/203 |
| 2016/0112770 | A1* | 4/2016 | Harrison | ............... | G06F 9/5072 725/31 |

\* cited by examiner

*Primary Examiner* — Craig C Dorais
(74) *Attorney, Agent, or Firm* — Haynes and Boone, LLP

(57) ABSTRACT

The present disclosure provides for managing a software function. The system determines that a service instance is to call the software function and, in response, initiates a call request for the software function to a management component The call request includes identification information and an operation parameter of the software function, with the software function shared by a service instance and at least one further service instance deployed and stored in a converged infrastructure architecture independently from the service instance and the at least one further service instance. The system receives a response to the call request from the management component, with the response including a result of execution of the software function based on the operation parameters. The system prevents the need to deploy copies of a common software function of service instances, conserving performance and storage space, and enabling more convenient maintenance, updates, and software function calls.

18 Claims, 5 Drawing Sheets

METHODS, DEVICES AND COMPUTER PROGRAM PRODUCTS FOR MANAGING SOFTWARE FUNCTION

CROSS-REFERENCE TO RELATED APPLICATIONS

This application claims priority to Chinese Application Serial No. 201910300611.0 filed Apr. 15, 2019, entitled "METHOD, DEVICE, AND COMPUTER PROGRAM PRODUCT FOR MANAGING SOFTWARE FUNCTION," the disclosure of which is incorporated herein by reference in its entirety.

FIELD

Embodiments of the present disclosure relate to computer technologies and more particularly, to methods, electronic devices, and computer program products for managing a software function.

BACKGROUND

A converged infrastructure architecture or hyper-converged infrastructure (HCI) architecture is a virtual computing platform which combines computing, storage, networking, software resources and so on into a software-defined infrastructure architecture. Such virtual computing platform has been increasingly used widely. The virtualization technology is employed in the architecture to manage multiple computing devices and storage systems. Although the platform is composed of a plurality of physical devices and/or storage disks at a hardware level, resources on different devices/disks are consumed as a contiguous space through centralized virtualization. The contiguous space, for example, may be storage virtualization, hardware abstraction, and resource pool creation. In operation, different service instances are deployed to run in the converged infrastructure architecture. The running of the service instances may require the use of some software functions so as to provide the corresponding services.

SUMMARY

Embodiments of the present disclosure provide an improved solution for managing a software function.

In a first aspect of the present disclosure, there is provided a method of managing a software function. The method comprises: in response to determining that a service instance is to call the software function, initiating a call request for the software function to a management component, the call request comprising identification information and an operation parameter of the software function, the software function being shared by the service instance and at least one further service instance deployed in a converged infrastructure architecture and being stored in the converged infrastructure architecture independently from the service instance and the at least one further service instance; and receiving a response to the call request from the management component, the response comprising a result of execution of the software function based on the operation parameter.

In a second aspect of the present disclosure, there is provided a method of managing a software function. The method comprises: receiving a call request for the software function from a requestor, the call request comprising identification information and an operation parameter of the software function, the software function being shared by a plurality of service instances deployed in a converged infrastructure architecture and being stored independently from the plurality of service instances; in response to the call request, causing the software function identified by the identification information to be executed based on the operation parameters; and sending, to the requestor, a response to the call request, the response comprising a result of execution of the software function based on the operation parameter.

In a third aspect of the present disclosure, there is provided an electronic device. The electronic device comprises a processor and a memory coupled to the processor, the memory having instructions stored therein which, when executed by the processor, cause the device to perform acts. The acts comprise: in response to determining that a service instance is to call the software function, initiating a call request for the software function to a management component, the call request comprising identification information and an operation parameter of the software function, the software function being shared by a service instance and at least one further service instance deployed in a converged infrastructure architecture and being stored in the converged infrastructure architecture independently from the service instance and the at least one further service instance; and receiving a response to the call request from the management component, the response comprising a result of execution of the software function based on the operation parameter.

In a fourth aspect of the present disclosure, there is provided an electronic device. The electronic device comprises a processor and a memory coupled to the processor, the memory having instructions stored therein which, when executed by the processor, cause the device to perform acts. The acts comprise: receiving a call request for the software function from a requestor, the call request comprising identification information and an operation parameter of the software function, the software function being shared by a plurality of service instances deployed in a converged infrastructure architecture and being stored independently from the plurality of service instances; in response to the call request, causing the software function identified by the identification information to be executed based on the operation parameters; and sending, to the requestor, a response to the call request, the response comprising a result of execution of the software function based on the operation parameter.

In a fifth aspect of the present disclosure, there is provided a computer program product being tangibly stored on a computer-readable medium and comprising computer-executable instructions, the computer-executable instructions, when executed, causing a device to perform the method in the first aspect.

In a sixth aspect of the present disclosure, there is provided a computer program product being tangibly stored on a computer-readable medium and comprising computer-executable instructions, the computer-executable instructions, when executed, causing a device to perform the method in the second aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refer to the like elements in the example embodiments of the present disclosure.

DETAILED DESCRIPTION OF EMBODIMENTS

Figure 1:
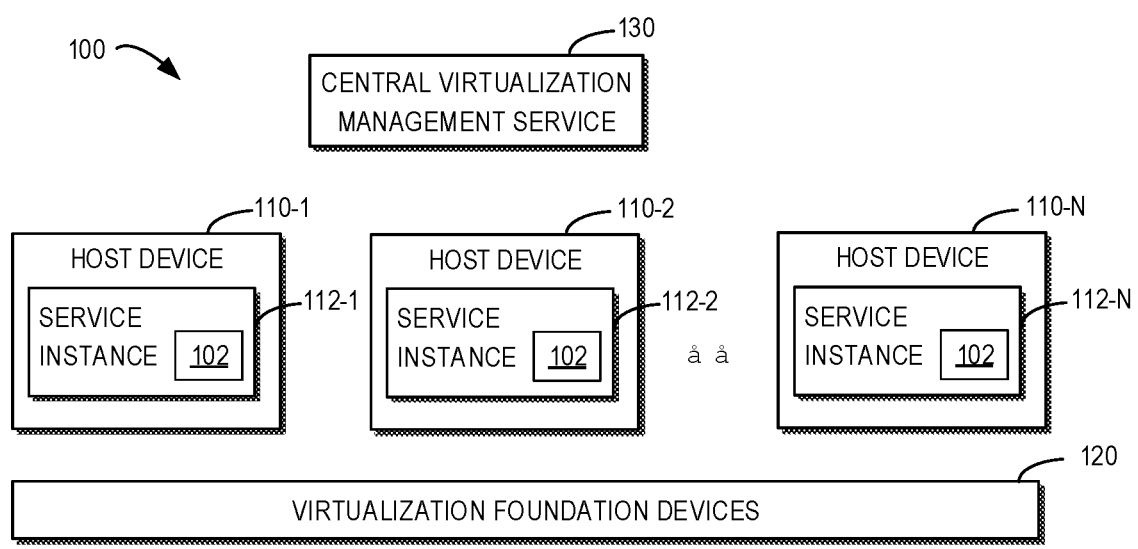
FIG. 1 illustrates a schematic block diagram of a conventional converged infrastructure architecture.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "include" and its variants are to be read as open-ended terms that mean "include, but is not limited to." The term "or" is to be read as "and/or" unless explicitly being defined otherwise. The term "based on" is to be read as "based at least in part on." The terms "one example embodiment" and "an embodiment" are to be read as "at least one example embodiment." The term "another embodiment" is to be read as "at least one further embodiment." The terms "first" and "second" can refer to different or the same objects. Other definitions, either explicit or implicit, may be included below.

As used herein, a converged infrastructure architecture is a virtual computing platform which combines computing, storage, networking, software resources, and so on into a software-defined infrastructure architecture. In the converged infrastructure architecture, computing, storage, networking and software resources are provided through a combination of pre-configured and integrated hardware and thus can be used as a contiguous space. The converged infrastructure architecture usually consists of three software components: computing virtualization, storage virtualization, and management. Virtualization software can abstract and pool underlying resources and dynamically allocate them to service instances running in virtual machines or containers. A customer may manage computing, storage and network connection from a single tool. An example evolution of the converged infrastructure architecture is referred to as a hyper-converged infrastructure (HCI) architecture.

As used herein, a "service" in the converged infrastructure architecture refers to a function, process, operation, capability or the like which is accessible to the converged infrastructure architecture. Examples of the service include a virtual computing environment, a virtual operating system, a virtual machine, a network, a server, a data storage center, a software product or an application. The actual deployment or activation of the service in the converged infrastructure architecture is referred to as a "service instance."

FIG. 1 illustrates a schematic block diagram of a conventional converged infrastructure architecture 100. As depicted in FIG. 1, different service instances 112-1, 112-2, . . . , 112-N are deployed in the converged infrastructure architecture 100. For convenience of description, these service instances are collectively or individually referred to as service instances 112. These service instances may be deployed in different host devices 110-1, 110-2, . . . , 110-N. For convenience of description, these host devices are collectively or individually referred to as host devices 110.

The service instances 112 are running on the deployed host devices 110 throughout a lifecycle from customer initial configuration to daily operation, status check, and/or the like. The converged infrastructure architecture 100 may be built on virtualization foundation devices 120. The converged infrastructure architecture 100 further includes a central virtualization management service 130 which is responsible for managing management operations such as service deployment, task scheduling, resource allocation, and the like in the converged infrastructure architecture 100.

Different service instances running on different host devices may rely on a common software function to perform their respective works. In the converged infrastructure architecture 100, each host device 110 may be physically isolated therefrom. If the service instance 112 deployed on a certain host device 110 is to use a software function on another host device, the service instance needs to import overall virtualization dependency in order to locate the software function, and determine how to communicate with another host device having the software function, and obtain an execution result of the software function. This may cause serious problems because the workload is very heavy to maintain the overall virtualization dependency on each service instance.

Therefore, in the conventional converged infrastructure architecture 100, each service instance 112 has a copy of the software function. As shown in FIG. 1, each of the respective service instances 112-1, 112-2, . . . , 112-N needs the software function 102. However, the deployment of a plurality of copies causes waste of the operation and storage space, and maintaining the plurality of copies is also difficult. A relative location of the software functions will change as the disk expands or other physical environments change. If the software function changes, the update of the software function is also complex and costly. In addition, in this case, it is also very complicated for the customer to call the software functions used by the service instance. For example, if a customer wants to call a software function in a Jar file package of a Java program, for example, a python script, the customer first needs to log in a corresponding host device, decompress the Jar file package, extract the python script, and instruct the script to be executed.

According to embodiments of the present disclosure, there is provided an improved solution for managing the software function in the converged infrastructure architecture. According to this solution, a software function shared by a plurality of service instances is stored in a converged infrastructure architecture independently from the service instances. When a service instance calls the software function, a call request for the software function is initiated to the management component. The call request includes identification information and an operation parameter of the software function. The management component causes the software function to be executed based on the operation parameter in response to the call request, and returns a result of the execution of the software function to the service instance. In this way, there is no need to deploy multiple copies of a common software function of multiple service instances, thereby reducing the consumption of performance and storage space, and enabling more convenient maintenance, update and call of the software function.

Example embodiments of the present disclosure will be described in detail below with reference to the figures.

Figure 2:
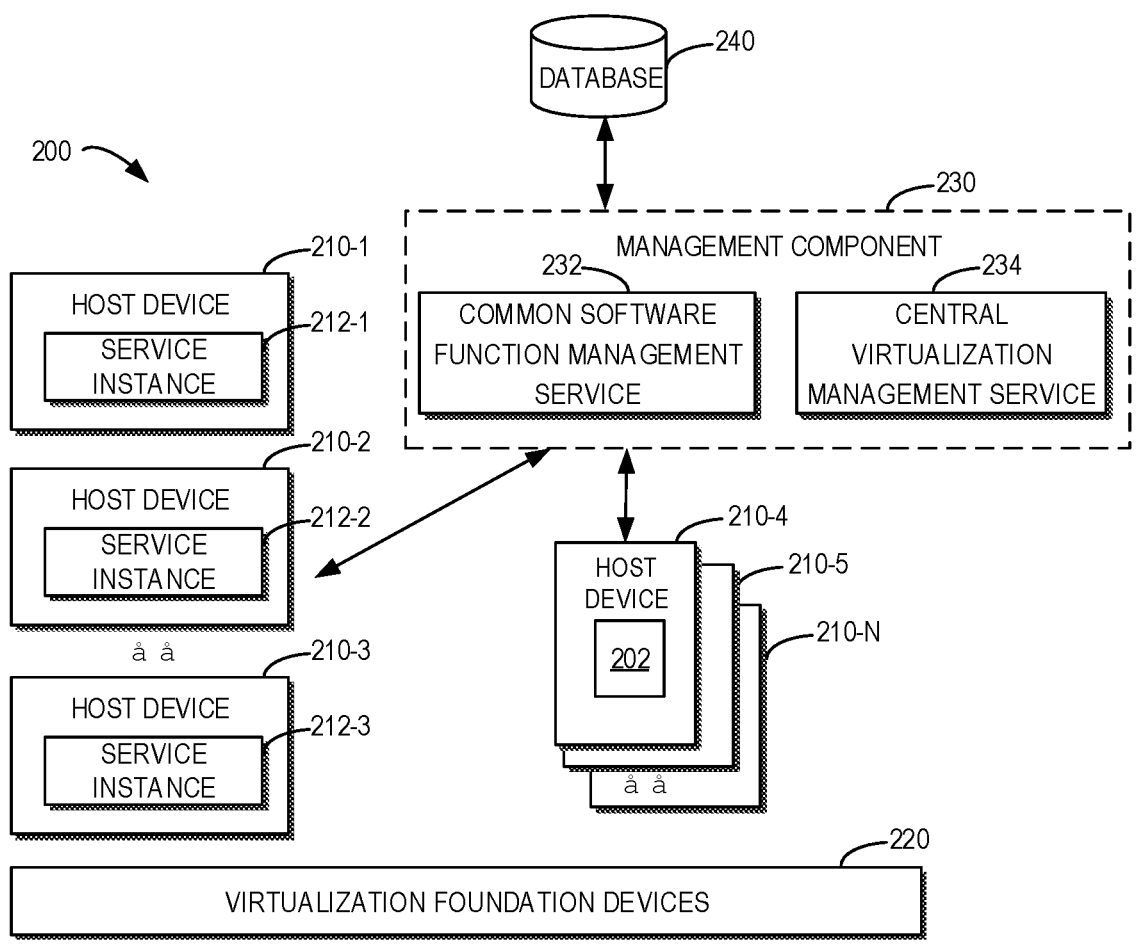
FIG. 2 illustrates a schematic block diagram of an converged infrastructure architecture according to some embodiments of the present disclosure.

Reference is first made to FIG. 2, which illustrates a schematic block diagram of an converged infrastructure architecture 200 according to some embodiments of the present disclosure. The converged infrastructure architecture 200 may be built on virtualization foundation devices 220, including various physical devices, storage disks, and so on that may provide computing, storage, network, and software resources. These foundation devices 220 form the converged infrastructure architecture 200 through a virtualization technique.

The converged infrastructure architecture 200 further includes a plurality of host devices 210-1, 210-2, 210-3, 210-4, 210-5, . . . , and 210-N. For convenience of description, these host devices are collectively or individually referred to as host devices 210. One or more of the host devices 210 shown in FIG. 2 may be considered as physical devices or virtual machines that are independent from each other. It would be appreciated that although FIG. 2 shows a certain number of host devices, the number is merely an example. In other embodiments, the converged infrastructure architecture 200 may have more, less, or any other number of host devices.

According to an embodiment of the present disclosure, a plurality of service instances 212-1, 212-2, 212-3, and so on are deployed in the converged infrastructure architecture 200. For convenience of description, these service instances are collectively or individually referred to as service instances 212. These service instances 212 are configured to provide the same or different services. The service instances 212 may be deployed in response to a customer's request or deployed by a management service as required. The plurality of service instances 212 may be deployed on a same host device 210 or different host devices 210. In the example of FIG. 2, the plurality of service instances 212-1, 212-2, 212-3 are deployed on different host devices 210. However, it should be understood that it is also feasible to deploy a plurality of service instances on a same host device.

Two or more service instances 212 deployed in the converged infrastructure architecture may need to use a same software function 202 to perform their respective tasks. The software function 202 may be any software component that may be called in the service instance 212 according to the requirements to implement a specific function. Examples of software functions may include various types of scripts, executables, installation packages, operating system resource bundles, applets, processes, dynamic link libraries (DLLs), and the like. Embodiments of the present disclosure are not limited in this regard. In the converged infrastructure architecture, the software functions 202 may also be referred to as resources sometimes. The software function 202 shared by the plurality of service instances 212 may thus also be referred to as a common resource or common software function.

Different from a plurality of copies of the common software function being deployed along with the service instances, according to an embodiment of the present disclosure, the software function 202 is stored independently from the plurality of service instances 212. For example, in the example of FIG. 2, the software function 202 is stored in the host device 210-4. Here, "independent" means that there is a certain degree of isolation between the software function 202 and the service instances 212, and the software function 20 has no need to be co-deployed into the same host device 210 as a part of the service instance 212.

It should be understood that FIG. 2 only shows one example of the storage of the software function 202. In other embodiments, the software function 202 may be stored in any other host devices 210, and even may be stored in a host device 210 that is also deployed with the service instance 212. In a scenario that the software function is stored in the same host device, the storage of the software functions 202 is not necessarily associated with the deployment of the service instances 212, but instead, the storage and deployment are performed respectively in response to centralized management of a management layer. In some implementations, the software function 202 may be stored in a distributed manner to a cluster consisting of a plurality of host devices 210. The scope of the embodiments of the present disclosure is not limited in this regard.

The converged infrastructure architecture 200 further includes a central virtualization management service 230 which is responsible for managing management operations such as service deployment, task scheduling, resource allocation, and the like in the converged infrastructure architecture 200. In an embodiment of the present disclosure, the management component 230 is responsible for managing the software function 202. Due to the independence or isolation between the service instances 212 and the software function 202, a service instance 212 sends the management component 230 a call request for the software function 202 when the software function 202 needs to be called. Depending on the software function and actual application requirements, the call request may be initiated initiatively by the service instance 212 as required during operation, may be initiated by a management procedure related to the service instance 212, or may be initiated by a management server, and so on. In some embodiments of the present disclosure, a requestor is referred to as a source of initiating the call request.

The management component 230 is configured to determine whether the software function 202 can be executed in response to the call request. The management component 230 may need to query a database 240 to determine related information. In some embodiments, the management component 230 may include a common software function management service module 232 and a central virtualization management service module 234. The common software function management service module 232 is configured to manage the software function 202 that is common to the plurality of service instances 212. In some embodiments, the common software function management service module 232 may be configured to manage only a single software function 202 in the converged infrastructure architecture 200, or may also be configured to manage one or more other software functions that are common to the plurality of service instances. The central virtualization management service 234 is configured to manage other functions in the converged infrastructure architecture 200, for example, implementation of service deployment, task scheduling, resource allocation, and the like.

In order to enable calling of the software function 202 that is stored independently, the service instance 212 needs to indicate the software function 202 to the management component 230. In the service instance 212, the software function 202 may be represented by identification information and a operation parameter(s) required by the service instance 212. When the call request is initiated, the call request may include such identification information and operation parameter(s).

An operation parameter refers to a parameter that need to be passed by a specific service instance 112 to call the software function 202, including a parameter type, a specific value/name of the parameter, and the like. The provision of the operation parameter may permit execution of the software function 202 for the specific service instance 212. The identification information enables the management component 230 to identify the software function 202. In some embodiments, the identification information may include a unique identifier for the software function 202, for example, may be a Universally Unique Identifier (UUID). The identification information may additionally or alternatively include an access path of the software function in the converged infrastructure architecture, for example, which host device the identification information is stored on.

In some embodiments, the identification information may additionally or alternatively include a name of a storage system storing the software function or the similar identification information. The storage system, also referee to as a data storage cluster, a data center or the like, may be implemented by a cluster of a plurality of host devices. The name of the storage system enables the management component 230 to locate the software function 202 in which storage system. In the case that the name of the storage system is indicated, the access path may indicate a specific location of the software function 202 in the storage system. In some embodiments, the identification information may additionally or alternatively include the name of the software function 202.

The identification information and the operation parameter(s) of the software function 202 may be stored in a property file of the service instance 212. The property file may be stored in a corresponding host device 210 where the service instance 212 is deployed, or may be stored in any accessible storage location. In one embodiment, the identification information and the operation parameter(s) may be organized in the property file and/or included in the call request with a predefined data structure.

An example data structure including the identification information and the operation parameter(s) of the software function 202 is presented below.

```
{
  "resource_uuid":7b11121c-0eb7-4000-9eb0-61c45a236a28",
  "data_store":"HGXGBD200000-01-J2-service-datastore2",
  "type":"python-script",
  "path":"/pservice/payload/resoarce/disksmay/fetch-disk-status.py",
    "name":" fetch-disk-status.py ",
  "allow-operation-parameter":{
    "disk-smay":{'
      "parameters":[
        {
          "type":"uuid",
          "name":"disk-uuid"
        }
        {
          "type":"string",
          "name":"time-gap"
        }
      ]
    }
  }
}
```

In the above specific example, the software function 202 is a function of extracting the status of the disks and in the form of a python script. The identification information of the software function 202 includes UUID "7b11121c-0eb7-4000-9eb0-61c45a236a28," and the name of the storage system storing the software function 202 is "HGXGBD200000-01-J2-service-datastore2," the access path in the storage system is "/pservice/payload/resource/diskscan/fetch-disk-status.py," and the type of the software function 202 is "python-script" (i.e., a python script). The operation parameters of the software function 202 indicate a parameter of a type "uuid," with a name of "disk-uuid" indicating an ID of the disk whose status is to be extracted. The operation parameters may further include a parameter of a type "string" (i.e., a string type) with a name of "time-gap" (i.e., a time interval), which indicates a time range in which the status of the disk is to be extracted.

It would be appreciated that the above only describes one specific example of the identification information and the operation parameter(s) of the software function for purpose of illustration, and is not intended to suggest any limitation to the scope of the present disclosure. In other embodiments, other identification information and operation parameters are also possible depending on the actual applications.

The converged infrastructure architecture according to some embodiments of the present disclosure is discussed above with reference to FIG. 2. It would be appreciated that FIG. 2 is only a schematic block diagram of the converged infrastructure architecture. The logical schematic block diagram of the converged infrastructure architecture may further have other representations and variations. According to the software function deployment of embodiments of the present disclosure, there are interactions between a requestor of the software function (such as the respective service instances 212), a manager of the software function (e.g., the management component 230), and an executor of the software function (e.g., the host device 210-4). The interaction processes will be further described below with reference to FIGS. 3 and 4.

Figure 3:
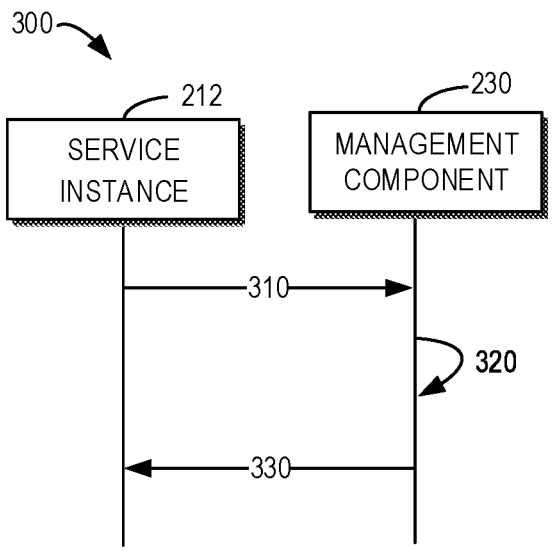
FIG. 3 illustrates a flowchart of a process of managing a software function in a converged infrastructure architecture according to some embodiments of the present disclosure.

FIG. 3 illustrates a flowchart of a process 300 of managing a software function in a converged infrastructure architecture according to some embodiments of the present disclosure. The process 300 involves the service instance 212 and the management component 230. For purpose of illustration, the process 300 will be described with reference to FIG. 2.

In response to determining that the service instance 212 is to call the software function 202, a call request for the software function 202 is initiated 310 from the service instance 212 to the management component 230. As mentioned above, the call request includes identification information of the software function, such as one or more of a unique identifier, a type, an access path, a name of a storage system, and so on. The identification information will not be described in detail any more. The call request may further include the operation parameter(s) of the software function. As mentioned above, in addition to the service instance 212 itself illustrated in FIG. 3, in an alternative embodiment, the requestor that initiates the call request may also be a management procedure or a management server, or the call request may even be manually initiated by a customer. In some embodiments, the identification information and the operation parameter(s) may be loaded from the property file of the service instance 212 and included into the call request.

In response to the call request, the management component 230 causes 320 the software function 202 identified by the identification information to be executed based on the operation parameter(s). After the call request is received, the management component 230 may parse the call request to extract the identification information and the operation parameter(s) of the software function 202 therefrom. The management component 230 locates the software function 202 in the converged infrastructure architecture 200 through the identification information and may perform corresponding management control to enable the software function 202 to be executed based on the operation parameter(s). For example, in the example of FIG. 2, the software function 202 is stored in the host device 210-4, and the management component 230 may configure an operating environment required by the software function 202 on the host device 210-4, including software and hardware resources, and so on, and executes the software function 202 on the host device 210-4.

In some embodiments, the management component 230 includes a common software function management service module 232 and a central virtualization management service module 234 which are separated from each other. There are certain interactions between the two modules to implement the management of the call for the software function 202. The calling for the software function 202 within management component 230 will be discussed in detail below with respect to FIG. 4.

After execution of the software function 202 is completed, the management component 230 sends a response to the call request to the requestor, which is the service instance 212 here, the response including an execution result of the software function 202 based on the operation parameters. In some embodiments, the passing of the execution result may be implemented based on a queue. Specifically, after the call request is initiated, the service instance 212 initiates a queue procedure to monitor a message queue from the management component 230. After obtaining the execution result of the software function 202, the management component 230 may place the result in a queue monitored by the service instance 212. Therefore, the service instance 212 may obtain the execution result by monitoring the queue procedure. The queue-based messaging may use any suitable message queue protocol, such as Advanced Message Queuing Protocol (AMQP) or any other protocols. The queue-based messaging may be, for example, implemented by using a specific middleware, such as Rabbit MQ or any other middleware. The message interaction between the management component 230 and the service instance 212 may also be implemented based on other messaging protocols in addition to the queue-based solution, such as a Hypertext Transfer Protocol (HTTP) or any other messaging protocol.

According to the embodiments of the present disclosure, each of the service instances 212 that commonly use the software function 202 may obtain the execution result of the common software function 202 through the process 300 without separately deploying a copy of the software function 202 on a local host device. The cost of maintaining only a single software feature is substantially reduced compared to the cost of maintaining a plurality of copies of the same software function. When a new service instance is to be deployed, if there is a software function that is common to other service instances, it only needs to store the identification information and the operation parameter(s) of the software function along with the deployment of the service instance. This will greatly increase the overall efficiency and stability of the converged infrastructure architecture. In addition, such management of the software function may better facilitate any (authorized) third party to call the software function conveniently, simplify the calling process, and improve the availability and calling efficiency of the software function. Such call for the software function may be implemented as a function application programming interface (API) in some examples.

Figure 4:
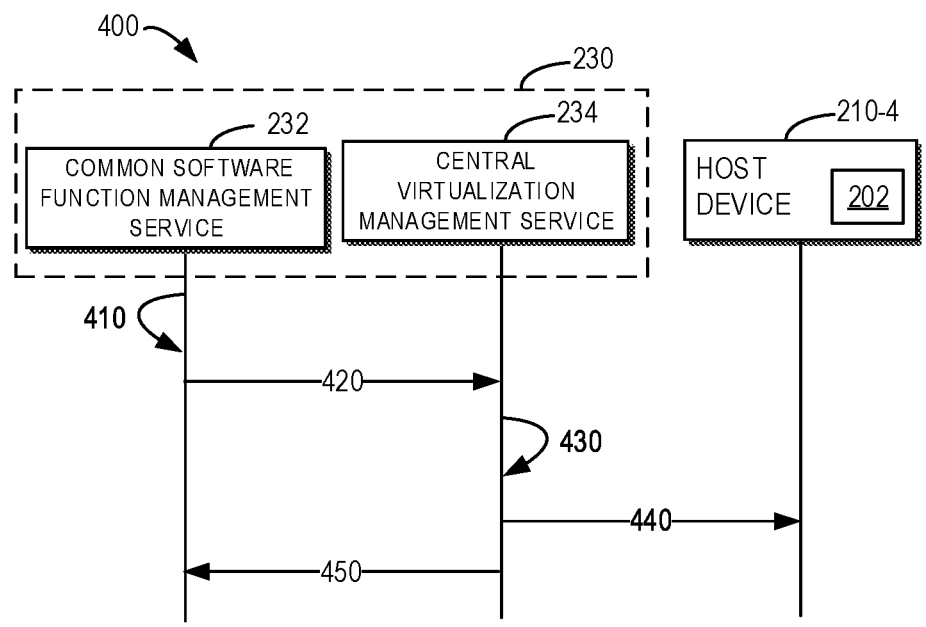
FIG. 4 illustrates a flowchart of a process of managing a software function in a converged infrastructure architecture according to some embodiments of the present disclosure.

Next, it will be discussed in detail with reference to FIG. 4 how the management component 230 implements the execution of the software function 202 after receiving the call request. FIG. 4 illustrates a flowchart of a process 400 of managing a software function in a converged infrastructure architecture according to some embodiments of the present disclosure. The process 400 involves the common software function management service module 232 and the central virtualization management service module 234 in the management component 230 and the host device 210-4 storing the software function 202. For purpose of illustration, the process 400 will be described with reference to FIGS. 2 and 3.

In an embodiment of the process 400, a requestor (e.g., service instance 212) may initiate a call request for the software function 202 to the common software function management service module 232. After receiving the call request, the common software function management service module 232 may parse the call request to extract the identification information and the operation parameter(s) of the software function 202 therefrom.

The common software function management service module 232 determines 410 whether at least one of the identification information and the operation parameter(s) included in the call request complies with the requirement of the software function 202. For example, the common software function management service module 232 may obtain the requirement of the software function 202 from the database 240, including correct identification information and/or standard operation parameter definition for the software function 202. The common software function management service module 232 may determine whether the identification information in the call request is accurate by comparison, and/or determine whether an operation parameter in the call request defines a correct or compliant type, parameter value, or the like. In this way, part of invalid or erroneous call requests may be filtered out to avoid triggering subsequent operations. It is possible to configure to check only one or more items of the identification information, check only one or more items of the operation parameter(s), or check both the identification information and the operation parameter(s).

If the common software function management service module 232 determines that at least one of the identification information and the operation parameter(s) to be checked complies with the requirement, the execution of the software function may be triggered. Specifically, the common software function management service module 232 sends 420 a task to be executed to the central virtualization management service module 234. The task at least includes the identification information and the operation parameter(s) of the software function 202. After receiving the task, the central virtualization management service module 234 determines 430 a storage location of the software function 202 within the converged infrastructure architecture based on the identification information. For example, in the example of FIG. 2, the central virtualization management service module 234 may locate, based on the identification information, that the software function 202 is stored in the host device 210-4.

The central virtualization management service module 234 then causes 440 the software function 202 to be executed at the storage location (i.e., the host device 210-4). Specifically, the central virtualization management service module 234 may configure an operation environment required by the software function 202 on the host device 210-4, including software and hardware resources, and the like, and run the task indicated by the common software function management service module 232 on the host device 210-4, including causing the software function 202 to be execute based on the operation parameter(s). After the task is completed, the central virtualization management service module 234 sends 450 the execution result of the software function 202 to the common software function management service module 232.

In some embodiments, the transfer of the execution result between the central virtualization management service module 234 and the common software function management service module 232 may be implemented based on a queue. Specifically, after sending the task, the common software function management service module 232 initiates a queue procedure to monitor the message queue from the central virtualization management service module 234. After the execution of the task is completed, the central virtualization management service module 234 places the execution result in a queue monitored by the common software function management service module 232. Thus, the common software function management service module 232 may obtain the execution result the through the monitoring of the queue procedure. As mentioned above, queue-based messaging may use any suitable message queue protocol. Certainly, it is possible to, in addition to the queue-based solution, implement based on other messaging protocols, such as HTTP or any other messaging protocols.

After receiving the result of the task, the common software function management service module 232 may send the received result of the task to the service instance 212 as a response to the call request. As mentioned above, the common software function management service module 232 may place the result in a queue that is monitored by the service instance. Alternatively, other messaging protocols may also be utilized to transfer the message directly to the service instance 212.

In some embodiments, if the common software function management service module 232 determines that at least one of the identification information and the operation parameter(s) in the call request does not comply with the requirement of the software function 202 when verifying the call request, the common software function management service module 232 may directly send a response to the call request which indicates that the call request does not comply with the requirement and cannot be executed. Thus, the service instance 212 may be avoided to monitor a response for a long time in the case of an erroneous call request.

In some embodiments, since the common software function 202 may be conveniently called by a third party, the management component 230 may also utilize certain security mechanisms to ensure the security of the software function 202. The management component 230 may verify whether the requestor initiating the call request has a permission to call the software function 202 and cause the software function 202 to be executed after determining that the requestor has the permission. The verification of permission may be based on various security mechanisms, examples of which may include an Open Authorization (OAuth) standard or any other suitable standard. Different security policies may be used depending on security requirements.

In some embodiments, the requestor, such as the service instance 212, may be pre-authorized with a certain token for the software function 202. When the service instance initiating the call request, the call request may carry the token. The management component 230 may extract the token from the call request and determine whether the requestor has the permission to call the software function 202 by verifying validity of the token.

In some embodiments, the management component 230 may include a separate security service module (not shown in FIG. 2) for implementing verification of the permission. In other embodiments, the verification of the permission may also be implemented by the common software function management service module 232 or the central virtualization management service module 234. The scope of the embodiments of the present disclosure is not limited in this regard.

It should be understood that although the management of the software function 202 by the management component 230 has been discussed in the embodiment in which the common software function management service module 232 and the central virtualization management service module 234 in the management component 230 are separate from each other, some or all of the described functions of one of the modules 232 and 234 may be implemented by the other. For example, the separate common software function management service module 232 may not be provided, and the central virtualization management service module 234 performs the management of the software functions 202. As another example, the identification information and/or the operation parameter(s) in the call request may be verified by the central virtualization management service module 234, and the common software function management service module 232 may act as a role of receiving and forwarding the call request. The scope of the embodiments of the present disclosure is not limited in this regard.

Figure 5:
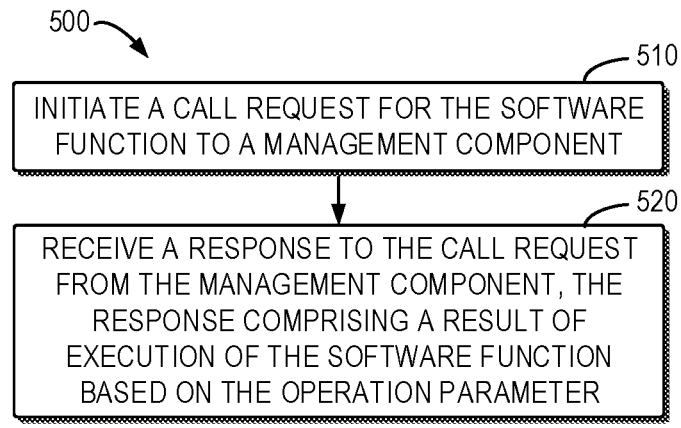
FIG. 5 illustrates a flowchart of a process implemented at a requestor of a software function according to some embodiments of the present disclosure.

FIG. 5 illustrates a flowchart of a process 500 implemented at a requestor of the software function according to some embodiments of the present disclosure. The process 500 may be implemented at the service instance 212 of FIG. 2, a management procedure, or a management server of managing the service instance 212 which initiates the call request. For purpose of illustration, the process 500 is described with reference to FIG. 2.

At block 510, the service instance 212, in response to determining that the service instance is to call the software function, initiates a call request for the software function to the management component, the call request including identification information and an operation parameter of the software function, the software function being shared by the service instance and at least one further service instance deployed in the converged infrastructure architecture and being stored in the converged infrastructure architecture independently from the service instance and the at least one further service instance. At block 520, the service instance 212 receives a response to the call request from the management component, the response comprising a result of execution of the software function based on the operation parameters.

In some embodiments, the identification information includes at least one of the following: a unique identifier of the software function and an access path of the software function in the converged infrastructure architecture.

In some embodiments, the identification information further includes at least one of the following: a type of the software function, and a name of a storage system that stores the software function.

In some embodiments, initiating a call request includes: loading the identification information and the operation parameter from a property file of the service instance; and initiating the call request by including the identification information and the operation parameter into the call request.

In some embodiments, the converged infrastructure architecture includes a hyper-converged infrastructure architecture.

Figure 6:
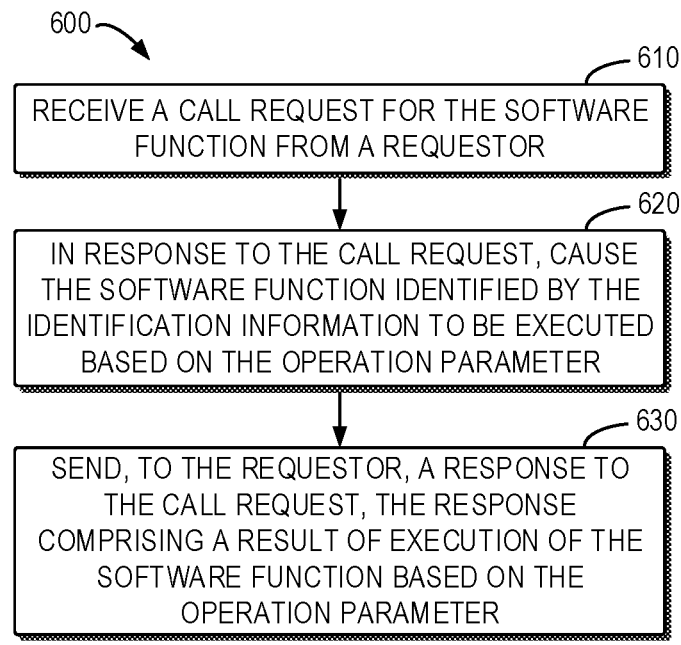
FIG. 6 illustrates a flowchart of a process implemented at a management component according to some embodiments of the present disclosure.

FIG. 6 illustrates a flowchart of a process 600 implemented at a management component according to some embodiments of the present disclosure. The process 600 may be implemented by the management component 230 of FIG. 2. For purpose of illustration, the process 600 is described with reference to FIG. 2.

At block 610, the management component 230 receives a call request for a software function from a requestor, the call request including identification information and an operation parameter of the software function, the software function being shared by a plurality of service instances deployed in the converged infrastructure architecture and being stored independently from the plurality of service instances. At block 620, the management component 230, in response to the call request, causes the software function identified by the identification information to be executed based on the operation parameter. At block 630, the management component 230 sends a response, to the requestor, to the call request, the response comprising a result of execution of the software function based on the operation parameter. In some embodiments, the requestor includes a service instance 212.

In some embodiments, causing the software function to be executed includes: verifying whether the requestor has a permission to call the software function; in response to the requestor having the permission, causing the software function to be executed.

In some embodiments, causing the software function to be executed includes: determining whether at least one of the identification information and the operation parameter included in the call request complies with requirement of the software function; and in response to determining at least one of the identification information and the operation parameter complies with the requirement, causing the software function to be executed.

In some embodiments, causing the software function to be executed includes: determining, based on the identification information, a storage location of the software function in the converged infrastructure architecture; and causing the software function to be executed at the storage location.

In some embodiments, the identification information includes at least one of the following: an identifier of the software function and an access path of the software function.

In some embodiments, the identification information further includes at least one of the following: a type of the software function, and a name of a storage system that stores the software function.

Figure 7:
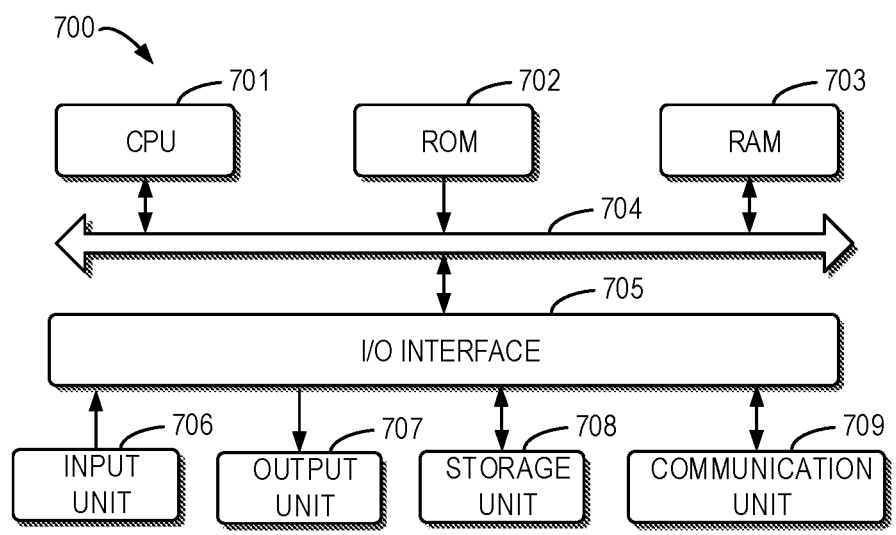
FIG. 7 illustrates a block diagram of an example device suitable for implementing embodiments of the present disclosure.

FIG. 7 illustrates a schematic block diagram of an example device 700 suitable for implementing embodiments of the present disclosure. The device 700 may be implemented as or included in the host device 210 of FIG. 2 or a device with the management component 230 running thereon.

As shown, the device 700 includes a central process unit (CPU) 701, which may execute various suitable actions and processing based on computer program instructions stored in a read-only memory (ROM) 702 or loaded in a random-access memory (RAM) 703 from a storage unit 708. The RAM 703 may also store various programs and data required by the operations of the device 700. The CPU 701, ROM 702 and RAM 703 are connected to each other via a bus 704. An input/output (I/O) interface 705 is also connected to the bus 704.

A plurality of components in the device 700 is connected to the I/O interface 705, including: an input unit 706, such as keyboard, mouse and so on; an output unit 707, e.g., various kinds of display and loudspeakers, and so on; a storage unit 708, such as disk and optical disk, and so on; and a communication unit 709, such as network card, modem, wireless transceiver and so on. The communication unit 709 enables the device 700 to exchange information/data with other devices via a computer network, such as Internet, and/or various telecommunication networks.

Each method and process described above, such as the process 500 and/or process 600, may also be performed by the processing unit 701. In some embodiments, the process 500 or process 600 may be implemented as a computer software program or a computer program product tangibly included in the machine-readable medium, e.g., the storage unit 708. In some embodiments, the computer program may be partially or fully loaded and/or mounted to the device 700 via the ROM 702 and/or communication unit 709. When the computer program is loaded to RAM 703 and executed by the CPU 701, one or more actions of the above described process 500 or process 600 may be implemented. Alternatively, the CPU 701 may be configured via any other suitable manners (e.g., by means of firmware) to execute the process 500 or process 600 in other embodiments.

Those skilled in the art would understand that various steps of the methods of the disclosure above may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of managing a software function, comprising:
in response to determining that a service instance is to call a software function, initiating, by a first device, a call request for the software function to a management component, the call request comprising identification information and an operation parameter of the software function, the software function being shared by the service instance and at least one further service instance deployed in a converged infrastructure architecture and being stored in the converged infrastructure architecture independently from the service instance and the at least one further service instance;

monitoring, by the first device a queue associated with the service instance for a response to the call request; and obtaining, by the first device in response to detecting the response in the queue, the response to the call request from the management component from the queue, the response comprising a result of execution of the software function based on the operation parameter, wherein the response in the queue was sent by the management component to the queue in response to verifying that the first device has a permission to call the software function.

2. The method of claim 1, wherein the identification information comprises at least one of the following: a unique identifier of the software function, and an access path of the software function in the converged infrastructure architecture.

3. The method of claim 2, wherein the identification information further comprises at least one of the following: a type of the software function, and a name of a storage system that stores the software function.

4. The method of claim 1, wherein initiating the call request comprises:
loading the identification information and the operation parameter from a property file of the service instance; and
initiating the call request by comprising the identification information and the operation parameter into the call request.

5. The method of claim 1, wherein the converged infrastructure architecture comprises a hyper-converged infrastructure architecture.

6. A method of managing a software function, comprising:
receiving a call request for a software function from a requestor, the call request comprising identification information and an operation parameter of the software function, the software function being shared by a plurality of service instances deployed in a converged infrastructure architecture and being stored independently from the plurality of service instances;
verifying whether the requester has a permission to call the software function;
in response to the requestor having the permission, causing the software function identified by the identification information to be executed based on the operation parameter by configuring an operation environment that includes software and hardware resources required by the software function on a host device; and
sending, to the requestor, a response to the call request, the response comprising a result of execution of the software function based on the operation parameter.

7. The method of claim 6, wherein causing the software function to be executed comprises:
determining whether at least one of the identification information and the operation parameter comprised in the call request complies with requirement of the software function; and
in response to determining that the at least one of the identification information and the operation parameter complies with the requirement, causing the software function to be executed.

8. The method of claim 6, wherein causing the software function to be executed comprises:

determining, based on the identification information, a storage location of the software function in the converged infrastructure architecture; and
causing the software function to be executed at the storage location.

9. The method of claim 6, wherein the identification information comprises at least one of the following: an identifier of the software function, and an access path of the software function.

10. The method of claim 9, wherein the identification information further comprises at least one of the following: a type of the software function, and a name of a storage system that stores the software function.

11. A system, comprising:
a first device including:
a first device processor; and
a first device memory coupled to the first device processor, the first device memory having instructions stored therein which, when executed by the first device processor, cause the first device to perform acts comprising:
receiving a call request for a software function from a second device, the call request comprising identification information and an operation parameter of the software function, the software function being shared by a plurality of service instances deployed in a converged infrastructure architecture and being stored independently from the plurality of service instances;
verifying whether the second device has a permission to call the software function;
in response to the second device having the permission, causing the software function identified by the identification information to be executed based on the operation parameter by configuring an operation environment that includes software and hardware resources required by the software function on a host device; and
sending, to the second device, a response to the call request, the response comprising a result of execution of the software function based on the operation parameter.

12. The system of claim 11, wherein causing the software function to be executed comprises:
determining whether at least one of the identification information and the operation parameter comprised in the call request complies with requirement of the software function; and
in response to determining at least one of the identification information and the operation parameter complies with the requirement, causing the software function to be executed.

13. The system of claim 11, wherein causing the software function to be executed comprises:
determining, based on the identification information, a storage location of the software function in the converged infrastructure architecture; and
causing the software function to be executed at the storage location.

14. The system of claim 11, comprising:
the second device including:
a second device processor; and
a second device memory coupled to the second device processor, the second device memory having instructions stored therein which, when executed by the second device processor, cause the second device to perform acts comprising:

in response to determining that a service instance is to call the software function, initiating the call request for the software function to the first device, the call request comprising the identification information and the operation parameter of the software function, the software function being shared by the service instance and at least one further service instance deployed in the converged infrastructure architecture and being stored in the converged infrastructure architecture independently from the service instance and the at least one further service instance;

monitoring a queue associated with the service instance for the response to the call request; and obtaining, in response to detecting the response in the queue, the response to the call request from the second device, the response comprising the result of execution of the software function based on the operation parameter.

15. The system of claim 14, wherein initiating the call request comprises:

loading the identification information and the operation parameter from a property file of the service instance; and initiating the call request by comprising the identification information and the operation parameter into the call request.

16. The system of claim 11, wherein the identification information comprises at least one of the following: a unique identifier of the software function, and an access path of the software function in the converged infrastructure architecture.

17. The system of claim 16, wherein the identification information further comprises at least one of the following: a type of the software function, and a name of a storage system that stores the software function.

18. The system of claim 11, wherein the converged infrastructure architecture comprises a hyper-converged infrastructure architecture.

\* \* \* \* \*